United States Patent
Kato et al.

(10) Patent No.: US 12,100,533 B2
(45) Date of Patent: Sep. 24, 2024

(54) PARTIAL DISCHARGE-RESISTANT PAINT, PARTIAL DISCHARGE-RESISTANT INSULATING COATING, ELECTRIC WIRE, AND ROTATING ELECTRIC MACHINE

(71) Applicant: SUMITOMO SEIKA CHEMICALS CO., LTD., Hyogo (JP)

(72) Inventors: Toshihiko Kato, Hyogo (JP); Shohei Fujimoto, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 696 days.

(21) Appl. No.: 17/250,768

(22) PCT Filed: Mar. 27, 2019

(86) PCT No.: PCT/JP2019/013118
§ 371 (c)(1),
(2) Date: Mar. 2, 2021

(87) PCT Pub. No.: WO2020/049783
PCT Pub. Date: Mar. 12, 2020

(65) Prior Publication Data
US 2021/0225553 A1 Jul. 22, 2021

(30) Foreign Application Priority Data

Sep. 3, 2018 (JP) .................. 2018-164716
Dec. 7, 2018 (JP) .................. 2018-229721

(51) Int. Cl.
*C09D 7/62* (2018.01)
*C09D 179/08* (2006.01)
(Continued)

(52) U.S. Cl.
CPC ............. *H01B 3/305* (2013.01); *C09D 7/62* (2018.01); *C09D 179/08* (2013.01); *H01B 3/308* (2013.01); *H01B 7/29* (2013.01)

(58) Field of Classification Search
None
See application file for complete search history.

(56) References Cited

U.S. PATENT DOCUMENTS 6,277,492 B1 * 8/2001 Boaz ................. C03C 17/42
428/335
2003/0044605 A1 * 3/2003 Smith ................. C08G 59/304
428/375
(Continued)

FOREIGN PATENT DOCUMENTS

CN 101501124 A 8/2009
CN 101945952 A 1/2011
(Continued)

OTHER PUBLICATIONS

Extended European Search Report in European Patent Application No. 19858056.5 issued May 6, 2022.
(Continued)

*Primary Examiner* — Sheeba Ahmed
(74) *Attorney, Agent, or Firm* — Knobbe, Martens, Olson & Bear, LLP

(57) ABSTRACT

There is provided a partial discharge-resistant paint that is excellent in the dispersibility of alumina particles, has an industrially suitable viscosity, and can form a coating that is excellent in partial discharge resistance and insulating properties. A partial discharge-resistant paint comprising at least one heat-resistant resin selected from the group consisting of a polyamide resin, a polyimide resin, a polyimide resin precursor, a polyamide-imide resin, a polyetherimide resin, and a polyester-imide resin; alumina particles having an aspect ratio of 2 to 99, and represented by the formula: $Al_2O_3 \cdot nH_2O$; at least one selected from the group consisting of an organophosphorous compound, a sulfonic acid compound, an amic acid compound, a triazole compound, a compound represented by formula (A) below, a compound represented by formula (B) below, a compound represented by formula (C) below, citric acid, ethylenediaminetetraacetic acid, and an ethylenediaminetetraacetic acid derivative; and a solvent, wherein the solvent comprises 90% by mass or more of a solvent having a boiling point of 100° C. or more at a pressure of 1 atm, the alumina particle content is 10 to 30% by mass relative to a total of 100% by mass of the heat-resistant resin and the alumina particles, and a total content of the heat-resistant resin and the alumina particles is 10 to 30% by mass.

[Formula 1]

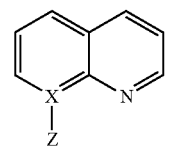

(A)

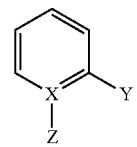

(B)

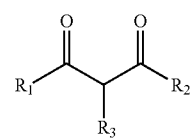

(C)

8 Claims, 1 Drawing Sheet

(51) Int. Cl.
*H01B 3/30* (2006.01)
*H01B 7/29* (2006.01)

(56) References Cited

U.S. PATENT DOCUMENTS

| | | | |
|---|---|---|---|
| 2009/0326097 A1 | 12/2009 | Fujita et al. | |
| 2011/0007490 A1 | 1/2011 | Onishi | |
| 2012/0247807 A1 | 10/2012 | Hanawa et al. | |
| 2013/0153263 A1* | 6/2013 | Seo | C09D 7/67 556/424 |
| 2014/0234617 A1 | 8/2014 | Masaki et al. | |
| 2018/0201804 A1* | 7/2018 | Hayashizaka | C09D 5/00 |
| 2018/0204648 A1 | 7/2018 | Hayashizaka et al. | |

FOREIGN PATENT DOCUMENTS

| | | |
|---|---|---|
| CN | 107710339 A | 2/2018 |
| EP | 2048189 A1 | 4/2009 |
| EP | 2270102 A1 | 1/2011 |
| EP | 3321941 A1 | 5/2018 |
| EP | 3848946 A1 | 7/2021 |
| JP | H11-126712 A | 5/1999 |
| JP | 2012-204270 A | 10/2012 |
| JP | 2013-060576 A | 4/2013 |
| WO | WO 2017/006999 A1 | 1/2017 |
| WO | WO 2017/007000 A1 | 1/2017 |

OTHER PUBLICATIONS

International Search Report for PCT/JP2019/013118 mailed on Jun. 4, 2019.
Ishida et al., "Development of Inverter Serge Resistant Insulating Materials Exceeding Silica-based Nanocomposites," 2017 National Convention record I.E.E. Japan, 2-058, pp. 65-66.
Chinese Office Action in Chinese Patent Application No. 201980056264.X issued Oct. 20, 2021.

* cited by examiner

SIDE VIEW

PARTIAL DISCHARGE-RESISTANT PAINT, PARTIAL DISCHARGE-RESISTANT INSULATING COATING, ELECTRIC WIRE, AND ROTATING ELECTRIC MACHINE

TECHNICAL FIELD

The present invention relates to a partial discharge-resistant paint, a partial discharge-resistant insulating coating, an electric wire, and a rotating electric machine.

BACKGROUND ART

Along with the recent growing awareness of energy conservation, the number of inverter-controlled electrical apparatuses (for example, household appliances such as air-conditioners, refrigerators, fluorescent lamps, and induction cookers; automobiles; electric trains; and elevators) has increased. Inverter control is one kind of control method in which an inverter is used to control the speed of an electric motor or the like through a variable voltage variable frequency AC power supply. This kind of inverter is controlled by high-speed switching elements operating at several to several hundreds of kHz, which cause a high surge voltage when voltage is applied. Recent inverters, particularly through the use of high-speed switching elements such as IGBTs (Insulated Gate Bipolar Transistors), have enabled abrupt rising of the voltage, which causes an instantaneous surge voltage at most twice as high as the output voltage.

As materials forming the coils of electrical apparatuses that use inverters, electric wires in which conductors are coated with insulating coatings (enamel coatings) are commonly used. However, because of the influence of the surge voltage, partial discharge occurs at the surface between electric wires formed into a coil, leading to a phenomenon in which the insulating coating is eroded. The partial discharge-induced erosion of the insulating coating ultimately leads to dielectric breakdown.

As techniques for preventing the erosion of the insulating coating due to the influence of the surge voltage, Patent Literature 1 and Non Patent Literature 1 disclose partial discharge-resistant insulating resin compositions containing boehmite and a resin.

CITATION LIST

Patent Literature

Patent Literature 1: WO 2017/007000

Non Patent Literature

Non Patent Literature 1: 2017 National Convention record I.E.E. Japan, General Lectures 2-058, Conference Abstracts

SUMMARY OF INVENTION

Technical Problem

Patent Literature 1 discloses a composition in which boehmite is dispersed in a polyimide resin. Boehmite, however, may exhibit a sudden gelling behavior when mixed with a polymer solution of a polyamic acid, a polyimide resin, a polyamide-imide resin, or the like, and is disadvantageous in that it cannot be uniformly dispersed at an industrially suitable viscosity in the polymer solution of a polyimide resin or the like.

Under such circumstances, it is a main object of the present invention to provide a partial discharge-resistant paint that is excellent in the dispersibility of alumina particles, has an industrially suitable viscosity, and can form a coating that is excellent in partial discharge resistance and insulating properties. It is another object of the present invention to provide a partial discharge-resistant insulating coating formed using the paint, an electric wire formed using the coating, and a rotating electric machine formed using the electric wire.

Solution to Problem

The present inventors have conducted extensive research to solve the above-described problem. Consequently, the inventors have found that a partial discharge-resistant paint comprising a heat-resistant resin, alumina particles having a predetermined aspect ratio, and represented by the formula: $Al_2O_3 \cdot nH_2O$, at least one selected from the group consisting of an organophosphorous compound, a sulfonic acid compound, a triazole compound, a compound represented by formula (A) below, a compound represented by formula (B) below, a compound represented by formula (C) below, citric acid, ethylenediaminetetraacetic acid, and an ethylenediaminetetraacetic acid derivative, and a solvent having a predetermined boiling point, wherein the alumina particle content and a total content of the heat-resistant resin and the alumina particles are each adjusted in a predetermined range, is excellent in the dispersibility of the alumina particles, has an industrially suitable viscosity, and forms a coating that is excellent in partial discharge resistance and insulating properties.

[Formula 1]

In each formula, X represents a carbon atom or a nitrogen atom; Z represents OH, SH, a hydrogen atom, or no substituent; Y represents OH, $NH_2$, SH, CHO, COOH, or $COCH_3$; and $R^1$, $R^2$, and $R^3$ each independently represent a $C_{1-2}$ alkyl group.

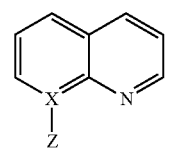
(A)

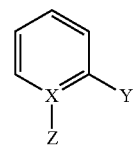
(B)

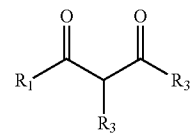
(C)

In summary, the present invention provides aspects of the invention comprising the following features:

Item 1. A partial discharge-resistant paint comprising:
at least one heat-resistant resin selected from the group consisting of a polyamide resin, a polyimide resin, a polyimide resin precursor, a polyamide-imide resin, a polyetherimide resin, and a polyester-imide resin;
alumina particles having an aspect ratio of 2 to 99, and represented by the formula: $Al_2O_3 \cdot nH_2O$;
at least one selected from the group consisting of an organophosphorous compound, a sulfonic acid compound, an amic acid compound, a triazole compound, a compound represented by formula (A) below, a compound represented by formula (B) below, a compound represented by formula (C) below, citric acid, ethylenediaminetetraacetic acid, and an ethylenediaminetetraacetic acid derivative; and
a solvent, wherein
the solvent comprises 90% by mass or more of a solvent having a boiling point of 100° C. or more at a pressure of 1 atm,
the alumina particle content is 10 to 30% by mass relative to a total of 100% by mass of the heat-resistant resin and the alumina particles, and
a total content of the heat-resistant resin and the alumina particles is 10 to 30% by mass:

[Formula 2]

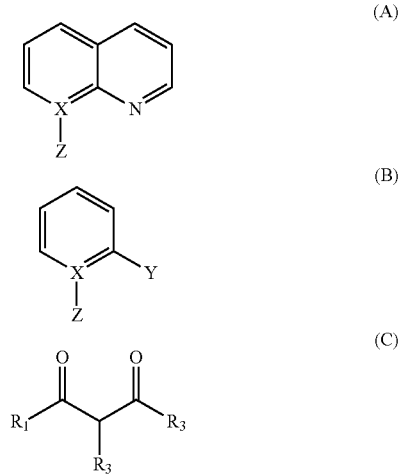

in each formula, X represents a carbon atom or a nitrogen atom; Z represents OH, SH, a hydrogen atom, or no substituent; Y represents OH, $NH_2$, SH, CHO, COOH, or $COCH_3$; and $R^1$, $R^2$, and $R^3$ each independently represent a $C_{1-2}$ alkyl group.

Item 2. The partial discharge-resistant paint according to item 1, wherein the partial discharge-resistant paint has a viscosity at 20° C. of 300 to 20000 mPa·s.

Item 3. A partial discharge-resistant insulating coating formed from the partial discharge-resistant paint according to item 1 or 2.

Item 4. An electric wire comprising a conductor and an insulating coating comprising a single layer or a plurality of layers formed on a perimeter of the conductor, wherein at least one layer of the insulating coating is the partial discharge-resistant insulating coating according to item 3.

Item 5. A rotating electric machine comprising the electric wire according to item 4.

Advantageous Effects of Invention

The present invention can provide a partial discharge-resistant paint that is excellent in the dispersibility of alumina particles, has an industrially suitable viscosity, and can form a coating that is excellent in partial discharge resistance and insulating properties. The present invention can also provide a partial discharge-resistant insulating coating formed using the paint, an electric wire formed using the coating, and a rotating electric machine formed using the electric wire.

DESCRIPTION OF EMBODIMENTS

Figure 1:
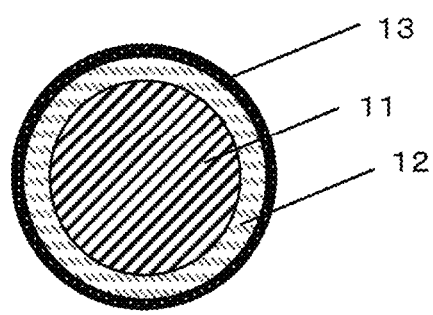
FIG. 1 is a schematic cross-sectional view for explaining one example of an electric wire of the present invention.

A partial discharge-resistant paint, a partial discharge-resistant insulating coating, an electric wire, and a rotating electric machine of the present invention will be hereinafter described in detail. As used herein, values connected with "to" refer to the numerical range including the values before and after "to" as the lower and upper limits. When a plurality of lower limits and a plurality of upper limits are mentioned separately, any lower limit and any upper limit may be selected and connected with "to".

1. Partial Discharge-Resistant Paint

The partial discharge-resistant paint of the present invention comprises at least one heat-resistant resin selected from the group consisting of a polyamide resin, a polyimide resin, a polyimide resin precursor, a polyamide-imide resin, a polyetherimide resin, and a polyester-imide resin; alumina particles having an aspect ratio of 2 to 99, and represented by the formula: $Al_2O_3 \cdot nH_2O$; at least one selected from the group consisting of an organophosphorous compound, a sulfonic acid compound, a triazole-based compound, a compound represented by formula (A) below, a compound represented by formula (B) below, a compound represented by formula (C) below, citric acid, ethylenediaminetetraacetic acid, and an ethylenediaminetetraacetic acid derivative; and a solvent, wherein the solvent comprises 90% by mass or more of a solvent having a boiling point of 100° C. or more at a pressure of 1 atm, the alumina particle content is 10 to 30% by mass relative to a total of 100% by mass of the heat-resistant resin and the alumina particles, and a total content of the heat-resistant resin and the alumina particles is 10 to 30% by mass.

[Formula 3]

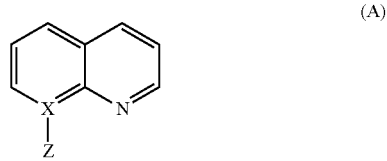

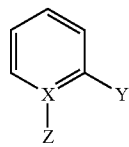

(B)

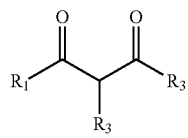

(C)

In each formula, X represents a carbon atom or a nitrogen atom; Z represents OH, SH, a hydrogen atom, or no substituent; Y represents OH, NH$_2$, SH, CHO, COOH, or COCH$_3$; and R$^1$, R$^2$, and R$^3$ each independently represent a C$_{1-2}$ alkyl group.

(Heat-Resistant Resin)

The heat-resistant resin is at least one selected from the group consisting of a polyamide resin, a polyimide resin, a polyimide resin precursor, a polyamide-imide resin, a polyetherimide resin, and a polyester-imide resin. Among the above, a polyimide resin, a polyimide resin precursor, and a polyamide-imide resin are preferred from the viewpoint of heat resistance. The polyimide resin, the polyimide resin precursor, and the polyamide-imide resin are each preferably a compound containing an aromatic group, from the viewpoint of heat resistance and insulating properties.

The polyimide resin and the polyimide resin precursor (polyamic acid) are each a polymer having an imide structure or a polymer having an imide structure as a result of imidization, and are each preferably formed from a diamine or a derivative thereof and an acid anhydride or a derivative thereof.

The polyimide resin is more preferably a compound having the repeating structure of formula (1) below. Similarly, the polyimide resin precursor (polyamic acid) is more preferably a precursor that forms the compound having the repeating structure of formula (1) below (polyimide resin) as a result of imidization. In formula (1) below, n is the number of the repeating structures, and is a positive integer. The polyimide resin may have a single type of repeating structure of formula (1) below, or may have two or more types of repeating structures of formula (1) below.

[Formula 4]

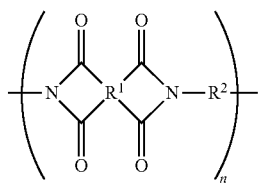

(1)

In formula (1) above, R$^1$ is a tetravalent group, and is an organic group having one or two benzene rings. In particular, R$^1$ is preferably at least one of the structures exemplified by formulae (2) below. The polyimide resin may have a single structure of those represented by formulae (2) below as R$^1$, or may be a copolymer having two or more structures of those represented by formulae (2) below as R$^1$'s.

[Formula 5]

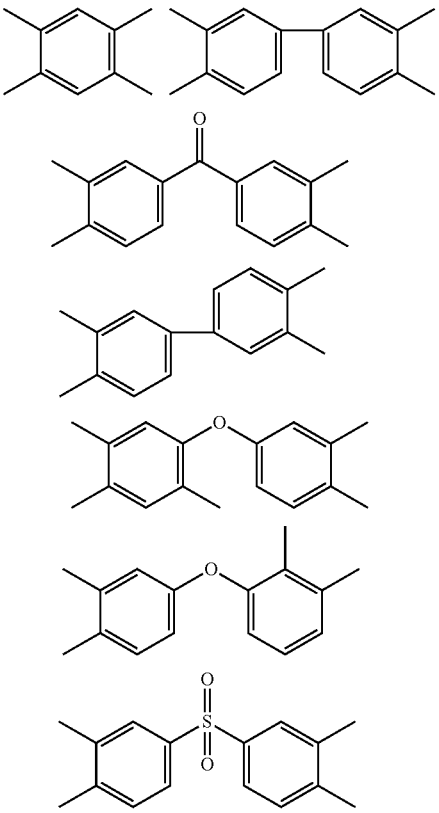

(2)

In formula (1) above, R$^1$ is more preferably at least one of the structures exemplified by formulae (3) below:

[Formula 6]

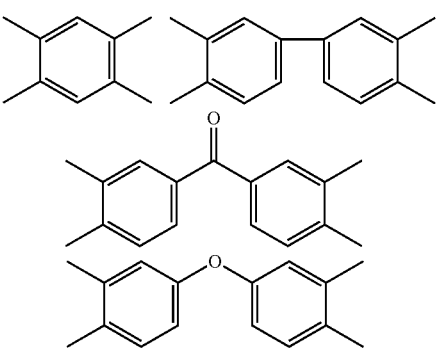

(3)

In formula (1) above, R$^2$ is a divalent group derived from an aromatic hydrocarbon. When R$^2$ is a combination of two or more such groups, these groups may be connected via at least one linking group selected from the group consisting of —O—, —SO$_2$—, —CO—, —CH$_2$—, and —S—.

The aromatic hydrocarbon group represented by R$^2$ (including those having the linking group and those not having the linking group) is, for example, at least one of the structures exemplified by formulae (4) below:

[Formula 7]

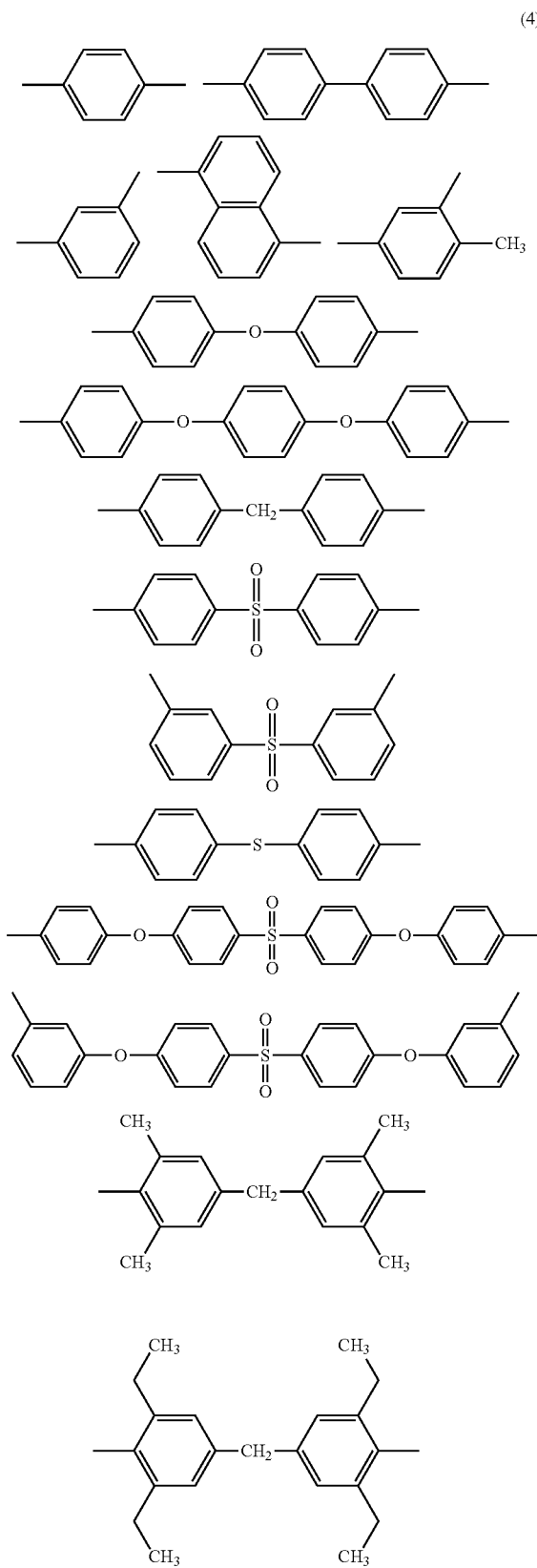

(4)

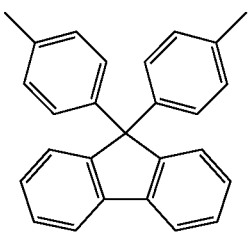

Preferred among R²'s represented by formulae (4) above is at least one of the structures exemplified by formulae (5) below:

[Formula 8]

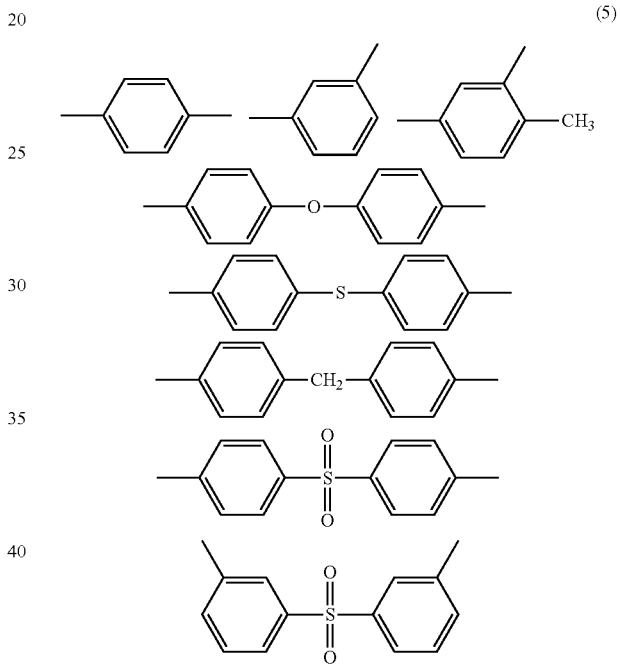

(5)

Other than the above-described polyimide resins, a polyimide resin that is excellent in heat resistant and insulating properties can be used. Specifically, for example, the polyimide resins disclosed in Japanese Patent No. 5281568 and the polyimide resins disclosed in Japanese Patent No. 5523456 can be used.

The polyamide-imide resin is a compound having the repeating structure of formula (6) below. In formula (6) below, n is the number of the repeating structures, and is a positive integer. The polyamide-imide resin may have a single type of repeating structure of formula (6) below, or may have two or more types of repeating structures of formula (6) below. The polyamide-imide resin can be synthesized using a known method. Examples of the synthesis method include isocyanate methods and amine methods (such as the acid chloride method, the low-temperature solution polymerization method, and the room-temperature solution polymerization method). The polyamide-imide resin to be used in the present invention is preferably a resin produced using an isocyanate method.

[Formula 9]

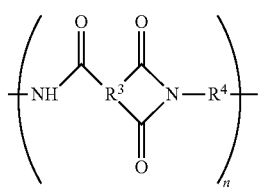
(6)

In formula (6), $R^3$ is a trivalent group, and is an organic group having one or two benzene rings. In particular, $R^3$ is preferably at least one of the structures exemplified by formulae (7) below.

[Formula 10]

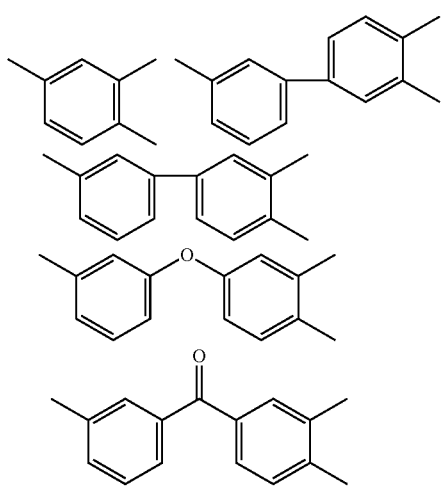
(7)

In formula (6), $R^3$ is more preferably the structure exemplified by formula (8) below:

[Formula 11]

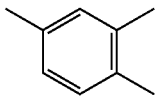
(8)

In formula (6) above, $R^4$ is a divalent group, and the polyamide-imide resin may have a single structure of those represented by formula (9) as $R^4$, or may be a copolymer having two or more structures of those represented by formula (9) as $R^4$'s.

[Formula 12]

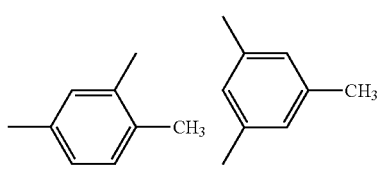
(9)

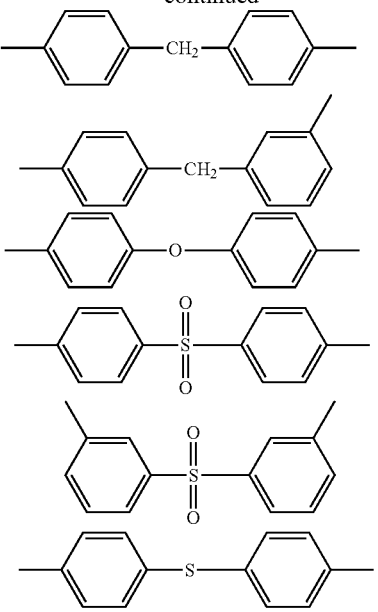

In particular, $R^4$ in formula (6) is at least one of the structures exemplified by formula (10) below:

[Formula 13]

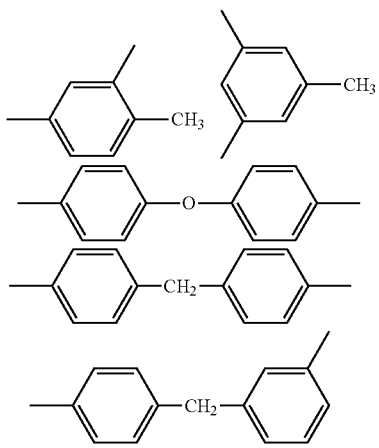
(10)

In the preparation of the partial discharge-resistant paint of the present invention, the heat-resistant resin may be used in the form of a solution or dispersion in a solvent (such as a resin varnish). As described below, the solvent contained in the partial discharge-resistant paint of the present invention contains 90% by mass or more of a solvent having a boiling point of 100° C. or more at a pressure of 1 atm (hereinafter referred to as the "solvent A"). Thus, when the heat-resistant resin is used in the form of a solution or dispersion in a solvent, the solvent for dissolving or dispersing the heat-resistant resin is selected such that the solvent contained in the partial discharge-resistant paint of the present invention contains 90% by mass or more of the solvent A.

Examples of the solvent for dissolving or dispersing the heat-resistant resin include amide solvents, such as N,N-dimethylformamide, N,N-dimethylacetamide, and N-methyl-2-pyrrolidone (NMP); cyclic ester solvents, such as γ-butyrolactone, γ-valerolactone, δ-valerolactone, γ-caprolactone, ε-caprolactone, and α-methyl-γ-butyrolactone; carbonate solvents, such as ethylene carbonate and propylene carbonate; glycol-based solvents, such as triethylene glycol; phenol-based solvents, such as phenol, o-cresol, m-cresol, p-cresol, 3-chlorophenol, and 4-chlorophenol; acetophenone; 1,3-dimethyl-2-imidazolidinone; sulfolane; and dimethylsulfoxide. Also usable are other common organic solvents, such as butyl acetate, ethyl acetate, isobutyl acetate, propylene glycol monomethyl ether acetate, ethyl cellosolve, butyl cellosolve, 2-methylcellosolve acetate, ethylcellosolve acetate, butylcellosolve acetate, tetrahydrofuran, dimethoxyethane, diethoxyethane, dibutyl ether, diethylene glycol dimethyl ether, methyl isobutyl ketone, diisobutyl ketone, cyclopentanone, cyclohexanone, methyl ethyl ketone, acetone, butanol, ethanol, xylene, toluene, chlorobenzene, benzyl alcohol, anisole, methoxypropanol, terpene, mineral spirits, and petroleum naphtha-based solvents. These solvents may also be used in combination. As described above, in order for the solvent contained in the partial discharge-resistant paint of the present invention to contain 90% by mass or more of the solvent A, preferred as the solvent for dissolving or dispersing the heat-resistant resin are N,N-dimethylformamide, N,N-dimethylacetamide, N-methyl-2-pyrrolidone, γ-butyrolactone, sulfolane, dimethylsulfoxide, and cyclohexanone.

(Alumina Particles)

The alumina particles have an aspect ratio of 2 to 99, and are represented by the following general formula (11):

$$Al_2O_3 \cdot nH_2O \qquad (11)$$

In formula (11), n is from 0 to 3. When n is 0, formula (11) represents an aluminum oxide, which is α-alumina, γ-alumina, or β-, ρ-, χ-, ε-, κ-, κ'-, θ-, η-, δ-, or λ-alumina. When n is greater than 0, formula (11) represents a mixture of various aluminum hydroxides in the form of hydrated aluminas.

Crystalline forms of aluminum hydroxides include trihydroxide (Al(OH)$_3$) (including gibbsite, bayerite, and nordstrandite); and two variants of aluminum hydroxide oxide (AlO(OH)), i.e., boehmite (γ-aluminum hydroxide oxide) and diaspore (α-aluminum hydroxide oxide). The aluminum hydroxide oxide is represented by formula (11) where n is 1, and the trihydroxide is represented by formula (11) where n is 3. Preferred among these alumina particles are α-alumina, γ-alumina, and boehmite in terms of stability and ease of production.

The alumina particles may have any aspect ratio (major axis/minor axis) in the range of 2 to 99, and preferably have an aspect ratio of 5 to 99, and more preferably have an aspect ratio of 10 to 99, from the viewpoint of partial discharge resistance.

As used herein, the aspect ratio refers to the ratio of the major axis to the minor axis (major axis/minor axis) of particles observed with a scanning electron microscope at 5000× magnification. That is, in the case of alumina particles in the form of plate-like particles, the aspect ratio is determined by dividing the average value of particle diameters by the average value of plate thicknesses; specifically, by dividing the average value of particle diameters by the average value of plate thicknesses for at least 100 plate-like particles of alumina particles. As used herein, the particle diameter of a plate-like particle corresponds to the diameter of a circle having the same area as that of a main surface of the plate-like particle. In the case of columnar or needle-like particles, the aspect ratio is determined by dividing the length of a needle or a column by the diameter of the needle or the column.

The alumina particles may have a known shape, such as a plate-like shape, a fibrous shape, a spindle-like shape, a needle-like shape, a cylindrical shape, or a columnar shape, and preferably have an anisotropic shape such as a plate-like or columnar shape, in order to impart improved partial discharge resistance to the partial discharge-resistant paint of the present invention. The alumina particles may also include, for example, hollow particles or flat particles having a shape like aligned columnar particles. The use of hollow particles can reduce the dielectric constant of the coating, and contribute to preventing the occurrence of particle discharge to thereby improve the durability as an insulating material.

The alumina particles are preferably nanoparticles. The "nanoparticles" refers to nanosized particles, and specifically, particles with an average particle diameter of about 1 nm to 1 μm. For example, when the alumina particles have a flat structure, the "nanoparticles" also includes particles whose average particle diameter in at least the width direction or thickness is about 1 nm to 1 μm.

The alumina particles preferably have an average particle diameter of 1 nm to 1 μm, and more preferably 5 to 500 nm, in order to achieve superior partial discharge resistance. The average particle diameter refers to the particle diameter at a cumulative value of 50% in the particle size distribution measured with a laser diffraction scattering-type particle size measurement apparatus (Microtrac).

In the preparation of the partial discharge-resistant paint of the present invention, the alumina particles can be used as a dispersion obtained by dispersing a powder in a solvent or as a dispersion obtained by the sol-gel process. The alumina particle dispersion is preferably a sol, particularly referred to as an alumina sol, obtained by adding to an alumina sol at least one of an organophosphorous compound, a sulfonic acid compound, an amic acid compound, a triazole compound, the compound represented by formula (A), the compound represented by formula (B), the compound represented by formula (C), citric acid, ethylenediaminetetraacetic acid, and an ethylenediaminetetraacetic acid derivative. The alumina particle dispersion may also be a commercially available product. Examples of commercially available products of the alumina particle dispersion include "Alumina sol-15A", "Alumina sol-10A", and "Alumina sol-10D" available from Kawaken Fine Chemicals Co., Ltd.; and "AS-520" available from Nissan Chemical Industries, Ltd.

In the partial discharge-resistant paint of the present invention, the alumina particle content is 10 to 30% by mass relative to a total of 100% by mass of the heat-resistant resin (solids content) and the alumina particles (solids content). The lower limit is preferably 15% by mass from the viewpoint of partial discharge resistance, while the upper limit is preferably 25% by mass from the viewpoint of flexibility of the coating formed from the paint. When the alumina particle content falls in the above-defined range and simultaneously, when the total content of the heat-resistant resin and the alumina particles and also the solvent A content fall in the below-described ranges, the partial discharge-resistant paint of the present invention is excellent in the dispersibility of the alumina particles, has an industrially suitable viscosity, and can form a coating that is excellent in partial discharge resistance and insulating properties.

In the partial discharge-resistant paint of the present invention, the total content of the heat-resistant resin (solids content) and the alumina particles (solids content) is 10 to 30% by mass. In order for the partial discharge-resistant paint of the present invention to be excellent in the dispersibility of the alumina particles, have an industrially suitable viscosity, and more satisfactorily form a coating that is excellent in partial discharge resistance and insulating properties, the total content is preferably 12 to 30% by mass, and more preferably 12 to 25% by mass.

The alumina particle dispersion contains a solvent (dispersion medium) for dispersing the alumina particles. As described above, the solvent contained in the partial discharge-resistant paint of the present invention contains 90% by mass or more of the solvent A having a boiling point of 100° C. or more at a pressure of 1 atm. Thus, the dispersion medium for the alumina particle dispersion is selected such that the solvent contained in the partial discharge-resistant paint of the present invention contains 90% by mass or more of the solvent A. The dispersion medium for the alumina particle dispersion may be identical to or different from, and is preferably identical to, the above-described solvent for dissolving or dispersing the heat-resistant resin.

The dispersion medium for the alumina particle dispersion is preferably a solvent having a boiling point of 100° C. or more at a pressure of 1 atm (at atmospheric pressure) (i.e., the solvent A), from the viewpoint of the appearance and uniformity of the resulting coating. Examples of the dispersion medium for the alumina particle dispersion include amide solvents, such as N,N-dimethylformamide, N,N-dimethylacetamide, and N-methyl-2-pyrrolidone (NMP); cyclic ester solvents, such as γ-butyrolactone, γ-valerolactone, δ-valerolactone, γ-caprolactone, ε-caprolactone, and α-methyl-γ-butyrolactone; phenol-based solvents, such as phenol, o-cresol, m-cresol, p-cresol, 3-chlorophenol, and 4-chlorophenol; acetophenone; 1,3-dimethyl-2-imidazolidinone; sulfolane; dimethylsulfoxide; and other common organic solvents, such as butyl acetate, isobutyl acetate, propylene glycol methyl ether acetate, ethyl cellosolve, butyl cellosolve, 2-methylcellosolve acetate, ethylcellosolve acetate, butylcellosolve acetate, diethoxyethane, dibutyl ether, methyl isobutyl ketone, diisobutyl ketone, cyclopentanone, cyclohexanone, propanol, butanol, methoxypropanol, benzyl alcohol, xylene, toluene, chlorobenzene, and anisole. These dispersion media for the alumina particle dispersion may be used alone or as a mixture of two or more.

Preferred among the above are N,N-dimethylformamide, N,N-dimethylacetamide, N-methyl-2-pyrrolidone, γ-butyrolactone, methyl isobutyl ketone, diisobutyl ketone, cyclopentanone, cyclohexanone, methoxypropanol, and benzyl alcohol, from the viewpoint of compatibility with the above-described heat-resistant resin and the dispersibility of the alumina particles.

(Organophosphorous Compound, Sulfonic Acid Compound, Amic Acid Compound, Triazole Compound, Compound Represented by Formula (A) Above, Compound Represented by Formula (B) Above, Compound Represented by Formula (C) Above, Citric Acid, Ethylenediaminetetraacetic Acid, and Ethylenediaminetetraacetic Acid Derivative)

The partial discharge-resistant paint of the present invention contains at least one selected from the group consisting of an organophosphorous compound, a sulfonic acid compound, a triazole compound, the compound represented by formula (A) above, the compound represented by formula (B) above, the compound represented by formula (C) above, citric acid, ethylenediaminetetraacetic acid, and an ethylenediaminetetraacetic acid derivative.

Each of the organophosphorous compound, the sulfonic acid compound, the triazole compound, the compound represented by formula (A), the compound represented by formula (B), the compound represented by formula (C), citric acid, ethylenediaminetetraacetic acid, and the ethylenediaminetetraacetic acid derivative may be bound to the alumina particles in any form of covalent bonding, coordinate condensation, hydrogen bonding, electrostatic bonding, and the like. When the alumina particles are bound to these compounds, it is not required that all the compounds be bound in the above-described manner, and it is only required that at least one or more of the compounds be bound.

In the partial discharge-resistant paint of the present invention, the organophosphorous compound, the sulfonic acid compound, the triazole compound, the compound represented by formula (A), the compound represented by formula (B), the compound represented by formula (C), citric acid, ethylenediaminetetraacetic acid, and the ethylenediaminetetraacetic acid derivative may be used alone or in combination.

Examples of the organophosphorous compound include phosphates, such as phosphoric acid, methyl acid phosphate, dimethyl acid phosphate, ethyl acid phosphate, diethyl acid phosphate, propyl acid phosphate, dipropyl acid phosphate, butyl acid phosphate, dibutyl acid phosphate, butoxyethyl acid phosphate, dibutoxyethyl acid phosphate, n-octyl acid phosphate, di-n-octyl acid phosphate, 2-ethylhexyl acid phosphate, di-2-ethylhexyl acid phosphate, n-lauryl acid phosphate, di-n-lauryl acid phosphate, 2-hydroxyethyl methacrylate acid phosphate, di-2-hydroxyethyl methacrylate acid phosphate, phenyl acid phosphate, and diphenyl acid phosphate; cyclic organophosphorous compounds, such as 9,10-dihydro-9-oxa-10-phosphaphenanthrene-10-oxide, 9-hydro-10-(2,5-dihydroxyphenyl)-9-oxa-10-phosphaphenanthrene-10-oxide, 10-benzyl-9,10-dihydro-9-oxa-10-phosphaphenanthrene-10-oxide, and 6,8-dibromo-9,10-dihydro-9-oxa-10-phosphaphenanthrene-10-oxide; and phosphonic acid compounds, such as methylphosphonic acid, ethylphosphonic acid, propylphosphonic acid, butylphosphonic acid, hexylphosphonic acid, heptylphosphonic acid, phenylphosphonic acid, and methylenediphosphonic acid. From the viewpoint of dispersibility, preferred among the above are those containing 6 or less carbon atoms, and more preferred are methyl acid phosphate, dimethyl acid phosphate, ethyl acid phosphate, diethyl acid phosphate, butyl acid phosphate, phenyl acid phosphate, methylphosphonic acid, ethylphosphonic acid, and phenylphosphonic acid.

The above-described organophosphorous compounds may be used alone or as a mixture of two or more. As used herein, "two or more" includes a combination of different chemical species, such as butoxyethyl acid phosphate and butyl acid phosphate.

The sulfonic acid compound may be any compound having a sulfonic acid group, and examples include alkylsulfonic acids, such as methanesulfonic acid and ethanesulfonic acid; aromatic sulfonic acids, such as alkylbenzenesulfonic acids, for example, benzenesulfonic acid, p-toluenesulfonic acid, styrenesulfonic acid, and dodecylbenzenesulfonic acid; and esters of these sulfonic acids and lower alcohols. p-Toluenesulfonic anhydride and benzenesulfonic anhydride, which are dehydration-condensation products of the sulfonic acids, may also be used. These sulfonic acid compounds may be used alone or as a mixture of two or more.

The content of the organophosphorous compound and the sulfonic acid compound (when both compounds are used, the total content thereof) is preferably 1 to 15% by mass relative to the alumina particles. When the above-described content falls in this range, the alumina particles are readily uniformly dispersed in the partial discharge-resistant paint. This imparts excellent flexibility and insulating properties to the coating to be formed. The above-described content is more preferably 2 to 12% by mass, and still more preferably 2 to 10% by mass. If the content is less than 1% by mass, the alumina particles may not be uniformly dispersed in the heat-resistant resin. This may cause the formation of an electrical defect, and reduce the insulating properties, or reduce the flexibility of the coating, possibly inducing cracking of the coating. On the other hand, if the above-described content is above 15% by mass, excess acid may remain in the film, possibly inviting reduced insulating properties and deterioration of the mechanical properties of the resulting coating.

The amic acid compound is a compound having an amide group and a carboxylic acid group produced by the reaction of an amine and a dicarboxylic anhydride. The amic acid compound of the present invention preferably contains 1 amic acid structure, or 2 or more and 10 or less amic acid structures. The amic acid compound preferably has a molecular weight of 150 to 5000, and more preferably has a molecular weight of 150 to 3000.

The amic acid compound is produced by reacting an amino group and a dicarboxylic anhydride. A compound having two or more amic acid structures can be produced using a compound having two or more amino groups or dicarboxylic anhydrides in the molecule.

The amic acid compound content is preferably 50 to 500% by mass relative to the alumina particles. When the content falls in this range, the formation of agglomerates is reduced, resulting in a paint in which the particles are uniformly dispersed. The content is more preferably 100% by mass or more, and more preferably 150% by mass or more, from the viewpoint of the dispersibility of the alumina particles. On the other hand, the content is more preferably 300% by mass or less, from the viewpoint of film formability and the mechanical properties of the resulting coating.

The partial discharge-resistant paint of the present invention may further contain the organophosphorous compound and/or the sulfonic acid compound, in addition to the amic acid compound. When the partial discharge-resistant paint of the present invention contains the organophosphorous compound and/or the sulfonic acid compound, the content of the organophosphorous compound and the sulfonic acid compound preferably falls in the above-described range.

Examples of the triazole compound include 1-(1',2'-dicarboxyethyl)benzotriazol, (2'-hydroxyphenyl)benzotriazol, (2'-hydroxy-5'-methylphenyl)benzotriazol, 1-hydroxy-7-azabenzotriazol, and 4-azabenzotriazol.

Examples of the compound represented by formula (A) include 8-aminoquinoline, 8-quinolinol, 8-quinolinecarboxyaldehyde, and 8-quinolinecarboxylic acid.

Examples of the compound represented by formula (B) include 2-pyridinemethanol, 2-hydroxypyridine N-oxide, 2-aminopyridine, 2-hydroxypyridine, 2-pyridinecarboxyaldehyde, 2-aminopyridine N-oxide, 2-mercaptopyridine, 2-acetylpyridine, and pyridine-2-carboxylic acid.

Examples of the compound represented by formula (C) include acetylacetone, 3-methyl-2,4-pentanedione, 3-ethyl-2,4-pentanedione, and 3,5-heptanedione.

Examples of the ethylenediaminetetraacetic acid (EDTA) derivative include diethylenetriaminepentaacetic acid, 1,3-diamino-2-propanol-N,N,N',N'-tetraacetic acid, hexamethylenediaminetetraacetic acid, glycol ether diamine tetraacetic acid, ethylenediamine-N,N'-diacetic acid, nitrilotriacetic acid, N-(2-carboxyethyl)iminodiacetic acid, and 1,3-propanediamine-N,N,N',N'-tetraacetic acid.

The content of the triazole compound, the compound represented by formula (A), the compound represented by formula (B), the compound represented by formula (C), citric acid, ethylenediaminetetraacetic acid, and the ethylenediaminetetraacetic acid derivative is preferably 5 to 50% by mass relative to the alumina particles. When the content falls in this range, the formation of agglomerates is reduced, resulting in a paint in which the particles are uniformly dispersed. The content is more preferably 10% by mass or more, from the viewpoint of the dispersibility of the alumina particles. On the other hand, the content is more preferably 40% by mass or less, from the viewpoint of film formability and the mechanical properties of the resulting coating.

Among the above-described compounds, either one of the organophosphorous compound and the sulfonic acid compound and at least one selected from the group consisting of the amic acid compound, the triazole compound, the compound represented by formula (A), the compound represented by formula (B), the compound represented by formula (C), citric acid, ethylenediaminetetraacetic acid, and the ethylenediaminetetraacetic acid derivative can be used in combination. Using the two compounds, a paint having improved dispersibility can be obtained.

When the above-described combination is used, the content of the organophosphorous compound and the sulfonic acid compound preferably falls in the above-described range, and the content of the other compounds also preferably falls in the above-described range.

(Solvent)

The partial discharge-resistant paint of the present invention contains a solvent, and the solvent contains 90% by mass or more of the solvent A having a boiling point of 100° C. or more at a pressure of 1 atm. When the content of the alumina particles and the heat-resistant resin falls in the above-described predetermined range and simultaneously, when the solvent A content is 90% by mass or more, the partial discharge-resistant paint of the present invention is excellent in the dispersibility of the alumina particles, has an industrially suitable viscosity, and can form a coating that is excellent in partial discharge resistance and insulating properties. The boiling point of the solvent A at a pressure of 1 atm is preferably 100 to 300° C., and more preferably 130 to 250° C.

As described above, the heat-resistant resin can be used in the form of a solution or dispersion in a solvent, such as a resin varnish, and the alumina particles can be used in the form of an alumina dispersion. The solvent contained in the partial discharge-resistant paint of the present invention may be a solvent derived from these solvents. Alternatively, the solvent contained in the partial discharge-resistant paint of the present invention may be a solvent that is added separately from these solvents, in the preparation of the partial discharge-resistant paint. The solvent A contained in the partial discharge-resistant paint of the present invention may be composed of a single solvent, or may be composed of two or more solvents. The solvent is different from the above-described organophosphorous compound and sulfonic acid compound.

The solvent A having a boiling point of 100° C. or more can be selected from those exemplified in the sections of the heat-resistant resin and the alumina particles. Preferred examples include amide solvents such as N,N-dimethylformamide, N,N-dimethylacetamide, and N-methyl-2-pyrrolidone, γ-butyrolactone, sulfolane, dimethylsulfoxide, and cyclohexanone.

The solvent contained in the partial discharge-resistant paint of the present invention preferably contains 95% by mass or more, more preferably 99% by mass or more, and still more preferably 100% by mass, of the solvent A having a boiling point of 100° C. or more at a pressure of 1 atm.

The content of the solvent contained in the partial discharge-resistant paint of the present invention is preferably 70 to 90% by mass, and more preferably 75 to 88% by mass.

(Other Components)

The partial discharge-resistant insulating coating of the present invention may optionally further contain other components, in addition to the heat-resistant resin, the alumina particles, the organophosphorous compound, the sulfonic acid compound, the amic acid compound, the triazole compound, the compound represented by formula (A), the compound represented by formula (B), the compound represented by formula (C), citric acid, ethylenediaminetetraacetic acid, the ethylenediaminetetraacetic acid derivative, and the solvent.

Examples of other components include commonly known additives used in electrical insulating resin compositions, such as other resins and inorganic fillers. Examples of the additives include tackifiers, such as alkylphenol resin, alkylphenol-acetylene resin, xylene resin, coumarone-indene resin, terpene resin, and rosin; bromine-based flame retardants, such as polybromodiphenyl oxide and tetrabromobisphenol A; chlorine-based flame retardants, such as chlorinated paraffins and perchlorocyclodecane; phosphate-based flame retardants, such as phosphates and halogen-containing phosphates; boron-based flame retardants; oxide-based flame retardants, such as antimony trioxide; phenol-based, phosphorus-based, and sulfur-based antioxidants; inorganic fillers including silica, layered silicates, magnesium oxide, boron nitride, silicon nitride, and aluminum nitride; polysiloxanes, such as polysilsesquioxanes, polymethylsilsesquioxane, polydimethylsiloxane, and silicones; common plastic compounding components, such as thermal stabilizers, photostabilizers, UV absorbents, lubricants, pigments, cross-linking agents, cross-linking aids, silane coupling agents, and titanate coupling agents; fibers, such as aromatic polyamide fibers and glass fibers; and unreacted organic metals. The partial discharge-resistant paint may contain, for example, 0.1 to 10% by mass of these additives.

(Method for Producing Partial Discharge-Resistant Paint)

The partial discharge-resistant paint may be produced using, for example, a method including mixing a resin varnish formed by dissolving the heat-resistant resin in a solvent, the alumina particle dispersion, and at least one selected from the group consisting of the organophosphorous compound, the sulfonic acid compound, the amic acid compound, the triazole compound, the compound represented by formula (A), the compound represented by formula (B), the compound represented by formula (C), citric acid, ethylenediaminetetraacetic acid, and the ethylenediaminetetraacetic acid derivative. Because the partial discharge-resistant paint of the present invention has the above-described composition, the alumina particles are satisfactorily dispersed in the partial discharge-resistant paint.

For example, each of the organophosphorous compound, the sulfonic acid compound, the amic acid compound, the triazole compound, the compound represented by formula (A), the compound represented by formula (B), the compound represented by formula (C), citric acid, ethylenediaminetetraacetic acid, and the ethylenediaminetetraacetic acid derivative can be bound to the alumina particles in any form of covalent bonding, coordinate condensation, hydrogen bonding, electrostatic bonding, and the like, using the following method: Initially, an aluminum alkoxide is hydrolyzed in an aqueous acid solution to form a hydrated alumina. The resulting alcohol is distilled off, and then the hydrated alumina is peptized to obtain an aqueous aluminum particle dispersion.

Subsequently, the aqueous aluminum particle dispersion is mixed with at least one selected from the group consisting of the organophosphorous compound, the sulfonic acid compound, the amic acid compound, the triazole compound, the compound represented by formula (A), the compound represented by formula (B), the compound represented by formula (C), citric acid, ethylenediaminetetraacetic acid, and the ethylenediaminetetraacetic acid derivative; and subsequently, the mixture is subjected to solvent replacement. Using this method, an aluminum particle dispersion in which the above-described compound is bound to the alumina particles can be satisfactorily prepared.

Alternatively, the following method may also be used: The aqueous aluminum particle dispersion is subjected to solvent replacement, and subsequently mixed with at least one selected from the group consisting of the organophosphorous compound, the sulfonic acid compound, the amic acid compound, the triazole compound, the compound represented by formula (A), the compound represented by formula (B), the compound represented by formula (C), citric acid, ethylenediaminetetraacetic acid, and the ethylenediaminetetraacetic acid derivative. In this case also, an aluminum particle dispersion in which the above-described compound is bound to the alumina particles can be satisfactorily prepared. In this alumina particle dispersion, at least one selected from the group consisting of the organophosphorous compound, the sulfonic acid compound, the amic acid compound, the triazole compound, the compound represented by formula (A), the compound represented by formula (B), the compound represented by formula (C), citric acid, ethylenediaminetetraacetic acid, and the ethylenediaminetetraacetic acid derivative is chemically reacted with and bound to the surface of the alumina particles.

A uniform alumina particle dispersion that is stable for a long time can be obtained by allowing an appropriate amount of water to remain.

The resin varnish and the alumina particle dispersion may be mixed and dispersed using a commonly known method, such as a stirrer, a homogenizer, a mass-colloider, a bead mill, an ultrasonic disperser, a line mixer, a micro-reactor, a wet jet mill, a high-pressure emulsifying and dispersing device, or a planetary centrifugal mixer. Heating and cooling are optionally performed to improve dispersibility.

In the production of the partial discharge-resistant paint, removal of agglomerates is performed, as appropriate, using a conventionally known method, such as filtration or centrifugation. When this step is added, the partial discharge-resistant insulating coating obtained from the partial discharge-resistant paint or the electric wire formed using the partial discharge-resistant paint has stable mechanical properties and winding properties, and also exhibits excellent partial discharge resistance.

The partial discharge-resistant paint of the present invention preferably has a viscosity in the range of 300 to 20000 mPa·s as an industrially suitable viscosity. If the viscosity is less than 300 mPa·s, or is above 20000 mPa·s, the resulting coating may show variations in thickness, possibly leading to deterioration of the appearance and reduced insulating properties. The viscosity is preferably 500 to 15000 mPa·s, more preferably 1000 to 10000 mPa·s, and still more preferably 1500 to 8000 mPa·s. The viscosity of the partial discharge-resistant paint of the present invention can be adjusted by adjusting the composition and the solids content of the partial discharge-resistant paint. Because the partial discharge-resistant paint of the present invention has the above-described features, it can be satisfactorily adjusted to an industrially suitable viscosity.

2. Partial Discharge-Resistant Insulating Coating

The partial discharge-resistant insulating coating of the present invention is formed from the partial discharge-resistant paint. More specifically, the partial discharge-resistant insulating coating of the present invention is formed on the surface of a workpiece, by applying the partial discharge-resistant paint of the present invention to the workpiece, followed by baking.

In the method of forming the partial discharge-resistant insulating coating of the present invention, examples of application methods include, but are not limited to, a method in which the partial discharge-resistant paint is applied onto a metal with a coater; a method in which the partial discharge-resistant paint is repeatedly applied and dried with a dip coater or a die to obtain a coating with a predetermined thickness; and spray coating. Baking may be performed by heating at a high temperature (for example, 300° C. or more) for a predetermined time. The partial discharge-resistant insulating coating may also be formed by repeating a series of application and heating operations a plurality of times until a predetermined thickness of the coating is achieved.

The partial discharge-resistant insulating coating of the present invention preferably has a dielectric breakdown strength of 100 kV/mm or more. As discharge-induced degradation of the coating surface proceeds, the electric field strength applied per unit thickness of the inside of the coating increases, which readily causes dielectric breakdown. The dielectric breakdown strength is therefore preferably high, preferably 100 kV/mm or more.

3. Electric Wire

The electric wire of the present invention comprises a conductor and an insulating coating comprising a single layer or a plurality of layers formed on a perimeter of the conductor. At least one layer of the insulating coating is the partial discharge-resistant insulating coating of the present invention. Because the partial discharge-resistant insulating coating of the present invention is employed as at least one layer of the insulating coating of the electric wire, the electric wire can have excellent partial discharge resistance, leading to a dramatically improved insulation lifetime of the electric wire.

The electric wire of the present invention can be produced by, for example, applying the partial discharge-resistant paint of the present invention onto the surface of a conductor or onto another layer that covers the conductor, followed by baking, to form the partial discharge-resistant insulating coating. FIG. 1 is a schematic cross-sectional view of one example of the electric wire of the present invention. A partial discharge-resistant insulating coating 12 can be formed by repeating a plurality of times (for example, 10 to 20 times) a series of operations (application and heating) of applying the partial discharge-resistant paint of the present invention onto a conductor 11 at a predetermined thickness, and heating at a high temperature (for example, from 300 to 500° C. or more) for a predetermined time (for example, 1 to 2 minutes), until a predetermined thickness of the partial discharge-resistant insulating coating 12 is achieved. An optimal thickness of the partial discharge-resistant insulating coating 12 is selected according to the purpose. Examples of methods of applying the paint include commonly employed methods, such as applying the paint using a bar coater, a roller, a spin coater, a die, or the like. The heating temperature and time for the paint may be changed appropriately according to the types of the heat-resistant resin, the organic solvent, the dispersion medium, and the like contained in the paint.

Examples of other layers that may be provided on the electric wire of the present invention include an overcoat layer 13 disposed to cover the perimeter. The overcoat layer 13 may be formed of any material having excellent heat resistance and flexibility. The overcoat layer 13 is, for example, a layer formed of a polyamide-imide resin or a polyester-imide resin.

The conductor 11 is, for example, a copper wire composed of a low-oxygen copper, oxygen-free copper, or the like, or a copper alloy wire. The conductor 11 may also be another metal wire of aluminum, silver, nickel, or the like. While FIG. 1 shows the case where the conductor 11 has a circular cross section, the present invention is not limited thereto, and the conductor 11 may have a rectangular cross section, for example. The conductor 11 may also be a twisted pair wire formed by twisting a plurality of conductor wires. The conductor diameter of the conductor 11 is not limited, and an optimal value of the conductor diameter is selected appropriately according to the purpose.

4. Rotating Electric Machine

The rotating electric machine of the present invention is, for example, a rotating electric machine including the above-described electric wire. That is, the rotating electric machine of the present invention may be produced using the electric wire of the present invention, or may be produced by forming a rotating electric machine using a conductor, and then forming the partial discharge-resistant insulating coating on the surface of the conductor to form an electric wire.

Examples of the rotating electric machine include motors and generators.

EXAMPLES

The present invention will be hereinafter described in more detail with examples, although the present invention is in no way limited thereto.

(Synthesis of Polyamic Acid Varnish)

Production Example 1

In a 10-L four-neck flask equipped with a stirrer and a thermometer, 400.8 g of 4,4'-diaminodiphenylether and 4109 g of NMP were placed, and dissolved by heating to 40° C. with stirring under nitrogen. Subsequently, 220.0 g of pyromellitic anhydride and 279.5 g of biphenyltetracarboxylic dianhydride were gradually added to the solution. After the completion of the addition, the mixture was stirred for 1 hour to obtain a polyamic acid varnish in which an aromatic polyamic acid represented by formula (I) below was dissolved at a concentration of 18.0% by mass. In formula (I) below, n is an integer of 2 or more.

[Formula 14]

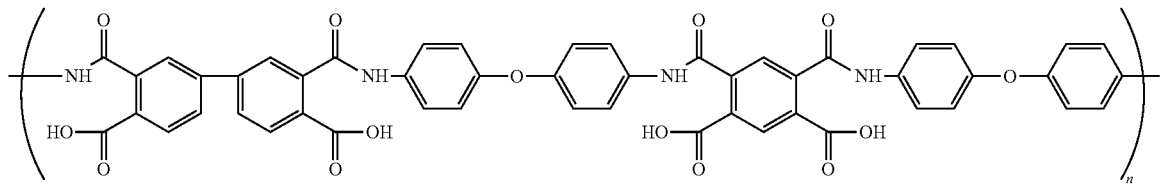

Formula (I)

Production Example 2

In a 10-L four-neck flask equipped with a stirrer and a thermometer, 400.5 g of 4,4'-diaminodiphenylether and 3780 g of NMP were placed, and dissolved by heating to 40° C. with stirring under nitrogen. Subsequently, 425.2 g of pyromellitic anhydride was gradually added to the solution. After the completion of the addition, the mixture was stirred for 1 hour to obtain a polyimide paint in which an aromatic polyamic acid represented by formula (II) below was dissolved at a concentration of 17.9% by mass. In formula (II) below, n is an integer of 2 or more.

[Formula 15]

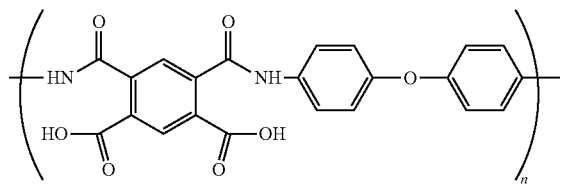

Formula (II)

(Synthesis of Polyamide-Imide Varnish)

Production Example 3

In a 3-L four-neck flask equipped with a stirrer and a thermometer, 192.1 g of trimellitic anhydride, 255.3 g of 4,4'-diphenylmethane diisocyanate, and 1210 g of NMP were placed, and the contents were heated to 160° C. with stirring under nitrogen and reacted for 1 hour. Subsequently, 2 g of methanol was added to terminate the reaction, and the reaction product was cooled to obtain a polyamide-imide varnish in which the polyamide-imide was dissolved at a concentration of 25.1% by mass.

(Synthesis of Amic Acid Compound (PAA))

Production Example 4

In a 200-ml recovery flask equipped with a stirrer, 10.29 g of 2-ethylaniline and 70 ml of NMP were placed, and dissolved with stirring under nitrogen. Subsequently, 14.81 g of phthalic anhydride was added, the mixture was reacted for 6 hours at room temperature, and the reaction product was reprecipitated, filtered, and dried to obtain an amic acid compound as a white powder. The powder was redissolved in NMP to obtain a 40% by mass solution of amic acid compound (PAA: Formula (III)).

[Formula 16]

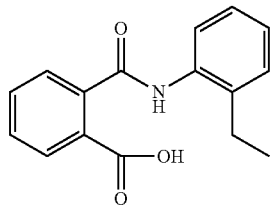

Formula (III)

(Synthesis of Amic Acid Compound (DPAA))

Production Example 5

In a 200-ml recovery flask equipped with a stirrer, 9.00 g of 4,4'-diaminodiphenyl ether and 46.4 g of NMP were placed, and dissolved with stirring under nitrogen. Subsequently, 13.32 g of phthalic anhydride was added, and the mixture was reacted for 24 hours at room temperature to obtain a 32.5% by mass solution of amic acid compound (DPAA: Formula (IV))

[Formula 17]

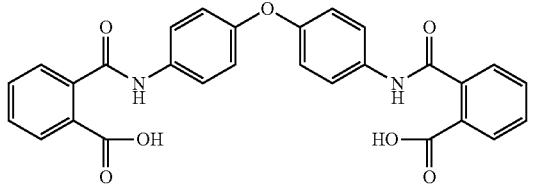

Formula (IV)

(Preparation of Partial Discharge-Resistant Paints)

Example 1

In a plastic sealed vessel, 8.16 g of NMP and 0.135 g of ethyl acid phosphate (Ethyl Phosphate(Mono- and Di-Ester mixture) available from Tokyo Chemical Industry Co., Ltd.; monoester content: 35.0 to 47.0%; diester content: 53.0 to 67.0%) were added to 21.84 g of an alumina particle dispersion (10.3% by mass, average particle diameter: 20 nm, aspect ratio: 50, NMP dispersion) and mixed to uniformity, and the mixture was added to 50 g of the polyamic acid varnish obtained in Production Example 1. The mixture was stirred using a planetary centrifugal mixer ("ARE-310" available from THINKY CORPORATION) for 5 minutes in the mixing mode (2000 rpm), and for 3 minutes in the defoaming mode (2200 rpm) to obtain a partial discharge-resistant paint. In the paint, the total content of the alumina particles and the resin was 14.0% by mass in the whole paint, and the alumina particle content was 20% by mass relative to the total content of the alumina particles and the resin. The paint had a viscosity at 20° C. of 4000 mPa·s.

Example 2

A paint was prepared as in Example 1, except that p-toluenesulfonic anhydride, instead of ethyl acid phosphate, was added in an amount of 0.225 g. The paint had a viscosity at 20° C. of 4000 mPa·s.

Example 3

In a plastic sealed vessel, 13.8 g of NMP and 0.119 g of ethyl acid phosphate were added to 19.3 g of an alumina particle dispersion (10.3% by mass, average particle diameter: 20 nm, aspect ratio: 50, NMP dispersion) and mixed to uniformity, and the mixture was added to 50 g of the polyamide-imide varnish obtained in Production Example 2. The mixture was stirred using a planetary centrifugal mixer ("ARE-310" available from THINKY CORPORATION) for 5 minutes in the mixing mode (2000 rpm), and for 3 minutes in the defoaming mode (2200 rpm) to obtain a partial discharge-resistant paint. In the paint, the total content of the alumina particles and the resin was 17.4% by mass in the whole paint, and the alumina particle content was 13.7% by mass relative to the total content of the alumina particles and the resin. The paint had a viscosity at 20° C. of 1300 mPa·s.

Example 4

A paint was prepared as in Example 1, except that phosphoric acid, instead of ethyl acid phosphate, was added in an amount of 0.068 g. The paint had a viscosity at 20° C. of 7000 mPa·s.

Example 5

In a plastic vessel, 10.14 g of NMP and 5.16 g of the solution of amic acid obtained in Production Example 4 were added to 10.0 g of an alumina particle dispersion (10.3% by mass, average particle diameter: 20 nm, aspect ratio: 50, NMP dispersion) and mixed to uniformity. Subsequently, in another plastic sealed vessel, 9.66 g of NMP was added to 32.5 g of the polyamic acid varnish obtained in Production Example 1 and mixed to uniformity, the alumina particle dispersion was added to the mixture, and the mixture was stirred using a planetary centrifugal mixer ("ARE-310" available from THINKY CORPORATION) for 5 minutes in the mixing mode (2000 rpm), and for 3 minutes in the defoaming mode (2200 rpm) to obtain a partial discharge-resistant paint. In the paint, the total content of the alumina particles and the resin was 10.2% by mass in the whole paint, and the alumina particle content was 15% by mass relative to the total content of the alumina particles and the resin. The paint had a viscosity at 20° C. of 5500 mPa·s.

Example 6

In a plastic vessel, 8.44 g of NMP and 7.14 g of the solution of amic acid obtained in Production Example 5 were added to 9.01 g of an alumina particle dispersion (10.3% by mass, average particle diameter: 20 nm, aspect ratio: 50, NMP dispersion) and mixed to uniformity. Subsequently, in another plastic sealed vessel, 5.84 g of NMP was added to 29.21 g of the polyamic acid varnish obtained in Production Example 1 and mixed to uniformity, the alumina particle dispersion was added to the mixture, and the mixture was stirred using a planetary centrifugal mixer ("ARE-310" available from THINKY CORPORATION) for 5 minutes in the mixing mode (2000 rpm), and for 3 minutes in the defoaming mode (2200 rpm) to obtain a partial discharge-resistant paint. In the paint, the total content of the alumina particles and the resin was 10.2% by mass in the whole paint, and the alumina particle content was 15% by mass relative to the total content of the alumina particles and the resin. The paint had a viscosity at 20° C. of 6500 mPa·s.

Example 7

In a plastic vessel, 10.47 g of NMP and 0.371 g of citric acid were added to 18.0 g of an alumina particle dispersion (10.3% by mass, average particle diameter: 20 nm, aspect ratio: 50, NMP dispersion) and mixed to uniformity. Subsequently, in another plastic sealed vessel, 11.7 g of NMP was added to 58.4 g of the polyamic acid varnish obtained in Production Example 1 and mixed to uniformity, the alumina particle dispersion was added to the mixture, and the mixture was stirred using a planetary centrifugal mixer ("ARE-310" available from THINKY CORPORATION) for 5 minutes in the mixing mode (2000 rpm), and for 3 minutes in the defoaming mode (2200 rpm) to obtain a partial discharge-resistant paint. In the paint, the total content of the alumina particles and the resin was 12.5% by mass in the whole paint, and the alumina particle content was 15% by mass relative to the total content of the alumina particles and the resin. The paint had a viscosity at 20° C. of 3000 mPa·s.

Example 8

In a plastic vessel, 8.9 g of NMP and 0.384 g of 8-quinolinol were added to 15.4 g of an alumina particle dispersion (10.3% by mass, average particle diameter: 20 nm, aspect ratio: 50, NMP dispersion) and mixed to uniformity. Subsequently, in another plastic sealed vessel, 10.0 g of NMP was added to 50.0 g of the polyamic acid varnish obtained in Production Example 1 and mixed to uniformity, the alumina particle dispersion was added to the mixture, and the mixture was stirred using a planetary centrifugal mixer ("ARE-310" available from THINKY CORPORATION) for 5 minutes in the mixing mode (2000 rpm), and for 3 minutes in the defoaming mode (2200 rpm) to obtain a partial discharge-resistant paint. In the paint, the total content of the alumina particles and the resin was 12.5% by mass in the whole paint, and the alumina particle content was 20% by mass relative to the total content of the alumina particles and the resin. The paint had a viscosity at 20° C. of 6500 mPa·s.

Example 9

A paint was prepared as in Example 8, except that 0.384 g of 8-quinolinol and 0.095 g of ethyl phosphate, instead of 0.384 g of 8-quinolinol, were added. The paint had a viscosity at 20° C. of 4000 mPa·s.

Example 10

A paint was prepared as in Example 1, except that the polyamic acid obtained in Production Example 2, instead of the polyamic acid obtained in Production Example 1, was used. The paint had a viscosity at 20° C. of 4700 mPa·s.

Example 11

A paint was prepared as in Example 1, except that UPIA (registered trademark)-AT (U-varnish-A) (polyamic acid concentration: 20% by mass) available from Ube Industries, Ltd., instead of the polyamic acid obtained in Production Example 1, was used by diluting it with NMP to 17.9%. The paint had a viscosity at 20° C. of 1500 mPa·s. UPIA (registered trademark)-AT (U-varnish-A) is a polyamic acid obtained by reacting 4,4'-diaminodiphenyl ether and biphenyltetracarboxylic dianhydride.

Comparative Example 1

In a plastic sealed vessel, 35 g of the polyamic acid varnish obtained in Production Example 1 was placed, and stirred using a planetary centrifugal mixer ("ARE-310" available from THINKY CORPORATION) for 5 minutes in the mixing mode (2000 rpm), and for 3 minutes in the defoaming mode (2200 rpm) to obtain a paint. The paint had a viscosity at 20° C. of 18000 mPa·s.

Comparative Example 2

In a plastic sealed vessel, 10.0 g of an alumina particle dispersion (10.3% by mass, average particle diameter: 20 nm, aspect ratio: 50, NMP dispersion) and 10 g of NMP were placed, and stirred using a planetary centrifugal mixer ("ARE-310" available from THINKY CORPORATION) for 3 minutes in the mixing mode (2000 rpm) to obtain a dispersion having an alumina particle content of 5.15% by mass. In a plastic sealed vessel, 17.5 g of the alumina particle dispersion (5.15% by mass) and 45.0 g of the polyamic acid varnish (18.0% by mass) obtained in Production Example 1 were placed, and stirred using a planetary centrifugal mixer ("ARE-310" available from THINKY CORPORATION) for 5 minutes in the mixing mode (2000 rpm), and for 5 minutes in the defoaming mode (2200 rpm) to obtain a paint. In the paint, the total content of the alumina particles and the resin was 14.4% by mass in the whole paint, and the alumina particle content was 10.0% by mass relative to the total content of the alumina particles and the resin. The paint had a viscosity at 20° C. of 9000 mPa·s.

Comparative Example 3

In a plastic sealed vessel, 10.0 g of a methanol silica sol (30.5% by mass, average particle diameter: 10 to 15 nm, methanol dispersion, available from Nissan Chemical Industries, Ltd.) and 10 g of N-methyl-2-pyrrolidone were placed, and stirred using a planetary centrifugal mixer ("ARE-310" available from THINKY CORPORATION) for 3 minutes in the mixing mode (2000 rpm) to obtain a dispersion having a silica particle content of 15.25% by mass. In a plastic sealed vessel, 13.3 g of the silica particle dispersion (15.25% by mass) and 45.0 g of the polyamic acid varnish (18.0% by mass) obtained in (Production Example 1) were placed, and stirred using a planetary centrifugal mixer ("ARE-310" available from THINKY CORPORATION) for 5 minutes in the mixing mode (2000 rpm), and for 5 minutes in the defoaming mode (2200 rpm) to obtain a paint. In the paint, the total content of the silica particles and the resin was 17.3% by mass in the whole paint, and the silica particle content was 20.0% by mass relative to the total content of the silica particles and the resin. The paint had a viscosity at 20° C. of 4000 mPa·s.

Comparative Example 4

A paint was prepared as in Example 1, except that ethyl acid phosphate was not added. The paint had a viscosity at 20° C. of 4000 mPa·s. The paint was turbid, and a coating obtained using the paint was cloudy due to agglomerates and thus, could not be evaluated.

Comparative Example 5

19.19 g of NMP was added to 7.89 g of an alumina particle dispersion (10.3% by mass, average particle diameter: 20 nm, aspect ratio: 50, NMP dispersion) and mixed to uniformity, and the mixture was placed in a plastic sealed vessel, and added to 50 g of a varnish obtained by diluting the polyamic acid varnish obtained in Production Example 1 to 6.5% by mass. The mixture was stirred using a planetary centrifugal mixer ("ARE-310" available from THINKY CORPORATION) for 5 minutes in the mixing mode (2000 rpm), and for 3 minutes in the defoaming mode (2200 rpm) to obtain a paint. In the paint, the total content of the alumina particles and the resin was 5.3% by mass in the whole paint, and the alumina particle content was 20% by mass relative to the total content of the alumina particles and the resin. The paint had a viscosity at 20° C. of less than 200 mPa·s.

Comparative Example 6

A paint was prepared as in Example 1, except that acetic acid, instead of ethyl acid phosphate, was added in an amount of 0.225 g. The paint gelled and thus, the viscosity could not be measured.

Comparative Example 7

A paint was prepared as in Example 3, except that ethyl acid phosphate was not added. The paint was turbid and gelled and thus, the viscosity could not be measured.

Comparative Example 8

A paint was prepared as in Example 1, except that an alumina particle dispersion (tetrahydrofuran (THF) dispersion) was used. In the paint, the total content of the alumina particles and the resin was 14.0% by mass in the whole paint, and the alumina particle content was 20% by mass relative to the total content of the alumina particles and the resin. The paint had a viscosity at 20° C. of 3800 mPa·s. (Production of Partial Discharge-Resistant Insulating Coatings)

Example 12

The paint obtained in Example 1 was applied onto a 284-μm-thick aluminum sheet using a blade coater. The paint applied onto the aluminum sheet was horizontally placed in a forced air oven, and dried at 90° C. for 40 minutes, and further heat-treated at 150° C. for 10 minutes, at 200° C. for 10 minutes, and at 300° C. for 30 minutes. The coating laminated on the aluminum sheet had a thickness of 50 μm, and had an alumina particle content of 20% by mass relative to the total content of the alumina particles and the resin.

Example 13

A coating was formed on an aluminum sheet as in Example 12, using the paint obtained in Example 2. The coating had a thickness of 50 μm, and had an alumina particle content of 20% by mass relative to the total content of the alumina particles and the resin.

Example 14

A coating was formed on an aluminum sheet as in Example 12, using the paint obtained in Example 3. The coating had a thickness of 50 μm, and had an alumina particle content of 15% by mass relative to the total content of the alumina particles and the resin.

Example 15

A coating was formed on an aluminum sheet as in Example 12, using the paint obtained in Example 4. The coating had a thickness of 50 μm, and had an alumina particle content of 20% by mass relative to the total content of the alumina particles and the resin.

Example 16

A coating was formed on an aluminum sheet, as in Example 12, using the paint obtained in Example 5. The coating had a thickness of 50 μm, and had an alumina particle content of 15% by mass relative to the total content of the alumina particles and the resin.

Example 17

A coating was formed on an aluminum sheet, as in Example 12, using the paint obtained in Example 6. The coating had a thickness of 50 μm, and had an alumina particle content of 15% by mass relative to the total content of the alumina particles and the resin.

Example 18

A coating was formed on an aluminum sheet, as in Example 12, using the paint obtained in Example 7. The coating had a thickness of 50 μm, and had an alumina particle content of 15% by mass relative to the total content of the alumina particles and the resin.

Example 19

A coating was formed on an aluminum sheet, as in Example 12, using the paint obtained in Example 8. The coating had a thickness of 50 μm, and had an alumina particle content of 15% by mass relative to the total content of the alumina particles and the resin.

Example 20

A coating was formed on an aluminum sheet, as in Example 12, using the paint obtained in Example 9. The coating had a thickness of 50 μm, and had an alumina particle content of 20% by mass relative to the total content of the alumina particles and the resin.

Example 21

A coating was formed on an aluminum sheet, as in Example 12, using the paint obtained in Example 10. The coating had a thickness of 52 μm, and had an alumina particle content of 20% by mass relative to the total content of the alumina particles and the resin.

Example 22

A coating was formed on an aluminum sheet, as in Example 12, using the paint obtained in Example 11. The coating had a thickness of 50 μm, and had an alumina particle content of 20% by mass relative to the total content of the alumina particles and the resin.

Comparative Example 9

A coating having a thickness of 50 μm was formed on an aluminum sheet, as in Example 5, using the paint obtained in Comparative Example 1.

Comparative Example 10

A film was tried to be formed on an aluminum sheet, as in Example 5, using the paint obtained in Comparative Example 2. However, a coating having good dispersibility of the alumina particles was not obtained.

Comparative Example 11

A coating was formed on an aluminum sheet, as in Example 5, using the paint obtained in Comparative Example 3. The coating had a thickness of 50 μm, and had a silica particle content of 20% by mass relative to the total content of the silica particles and the resin.

Comparative Example 12

A film was formed on an aluminum sheet, as in Example 5, using the paint obtained in Comparative Example 4. However, the coating contained many agglomerates, and was not evaluated.

Comparative Example 13

A film was tried to be formed on an aluminum sheet, as in Example 5, using the paint obtained in Comparative Example 5. However, the paint had a low viscosity unsuitable for forming a film, and a uniform coating was not obtained.

Comparative Example 14

The paint obtained in Comparative Example 6 was difficult to form a film due to the gelation, and produced irregularities. Thus, the coating was not evaluated.

Comparative Example 15

A film was formed on an aluminum sheet, as in Example 5, using the paint obtained in Comparative Example 7. However, the coating contained many agglomerates, and was not evaluated.

Comparative Example 16

A film was formed on an aluminum sheet, as in Example 5, using the paint obtained in Comparative Example 8. However, cissing occurred and thus, the coating was not evaluated.

(Evaluation of Appearances and Viscosities of Paints)

The appearance of each paint was evaluated based on four levels, by visually observing the turbidity of the paint. This is an index of determining whether or not agglomerates are formed. The presence or absence of agglomerates needs to be checked on the coating produced using the paint. The evaluation was performed based on the following four levels:

A: The paint has no turbidity, and what is seen through the liquid is clearly observed.

B: The paint appears to be not turbid, but is observed to be slightly more turbid than A.

C: The paint is obviously turbid, and what is seen through the liquid is blurry.

D: The paint is obviously turbid, and when the liquid flows, the liquid surface is observed to be rough.

When the paint is evaluated as "B", it is difficult to determine from the state of the paint whether the amount of agglomerates is large or small. It is thus necessary to produce a coating, and determine the amount of agglomerates. In contrast, when the paint is evaluated as C or D, it is obvious that the coating will also exhibit a large amount of agglomerates. The viscosities at 20° C. were measured using a Brookfield viscometer (Viscometer TVC-7 available from Toki Sangyo Co., Ltd.) (rotation speed: 20 rpm, rotors: No. 2, 3 and 4). Table 1 shows the results of evaluating the appearances and viscosities of the paints.

(Evaluation of Appearances of Partial Discharge-Resistant Insulating Coatings)

The appearance of each partial discharge-resistant insulating coating was evaluated by checking for agglomerates and cissing by visual observation or observation with an optical microscope. The evaluation criteria are as shown below. Table 2 shows the results.

(Observation of Agglomerates)

A: Agglomerates are not observed over the whole coating with a microscope, and a negligible amount of agglomerates are partially observed.

B: Agglomerates are not observed over the whole coating with a microscope, and a slight amount of agglomerates are partially observed.

C: When the amount of agglomerates is small, they are observed as grainy matter with a microscope, or when the amount of agglomerates is large, the coating surface is rough.

(Observation of Cissing)

A: No thickness irregularities due to cissing are observed.

B: Thickness irregularities due to cissing are partially formed.

C: Thickness irregularities due to cissing are formed throughout the surface.

(V-t Characteristics of Partial Discharge-Resistant Insulating Coatings)

Figure 2:
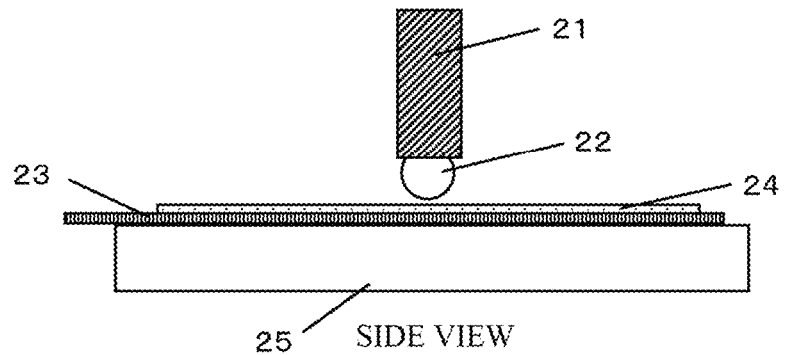
FIG. 2 is a schematic diagram for explaining the method of evaluating the insulating properties (V-t characteristics of partial discharge-resistant insulating coatings) in the examples.

For each of the above-described coatings formed on the aluminum sheet, the V-t characteristic was evaluated using the following testing method: Specifically, the testing method was as follows: As shown in FIG. 2, sequentially from below, on a stainless steel support 25, an aluminum sheet 23 covered with a partial discharge-resistant insulating coating 24 was mounted. A metal ball 22 (2 mm in diameter) and a copper tube 21 were sequentially placed thereon, and fixed to press under their own weight. The copper tube 21 and the aluminum sheet 23 were connected to a power supply, such that the metal ball 22 served as a high-voltage electrode and the aluminum sheet 23 as a low-voltage electrode. In this manner, partial discharge was induced across the metal ball and the insulating coating, and the time to dielectric breakdown of the partial discharge-resistant insulating coating was measured. An inverter pulse generator available from Nissin Pulse Electronics Co., Ltd. was used as the measuring apparatus. The measurement was performed at a voltage of 3 kV, a repetition frequency of 5 kHz, and a pulse width of 5 μs.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Heat-resistant resin varnish | | Resin concentration (% by mass) | 18 | 18 | 25 | 18 | 14 | 15 | 16 | 15 | 15 | 18 | 18 |
| | Polyamic acid | Solvent | NMP | NMP | NMP | NMP | NMP | NMP | NMP | NMP | NMP | NMP | NMP |
| | | Formula (I) | 80 | 80 | — | 80 | 85 | 85 | 85 | 85 | 80 | — | — |
| | | Formula (II) | — | — | — | — | — | — | — | — | — | 80 | — |
| | | U-varnish-A | — | — | — | — | — | — | — | — | — | — | 80 |
| | Polyamide-imide | Resin/(resin + alumina particles or silica particles) (% by mass) | — | — | 85 | — | — | — | — | — | — | — | — |
| Alumina particle dispersion | | Alumina particle concentration (% by mass) | 7.5 | 7.5 | 6 | 7.5 | 5.1 | 5.5 | 7.5 | 7.5 | 7.5 | 7.5 | 7.5 |
| | | Solvent | NMP | NMP | NMP | NMP | NMP | NMP | NMP | NMP | NMP | NMP | NMP |
| | | Alumina particles/(resin + alumina particles) (% by mass) | 20 | 20 | 14 | 20 | 15 | 15 | 15 | 15 | 20 | 20 | 20 |
| Silica dispersion | | Silica particle concentration (% by mass) | — | — | — | — | — | — | — | — | — | — | — |
| | | Solvent | — | — | — | — | — | — | — | — | — | — | — |
| | | Silica particles/(resin + silica particles) (% by mass) | — | — | — | — | — | — | — | — | — | — | — |
| Organophosphorous compound | | Ethyl phosphate Content (% by mass) relative to alumina | 6 | — | 6 | — | — | — | — | — | 6 | 6 | 6 |
| | | Phosphoric acid | — | — | — | 3 | — | — | — | — | — | — | — |
| Sulfonic acid compound | | p-Toluenesulfonic anhydride | — | 10 | — | — | — | — | — | — | — | — | — |
| Amic acid compound | | PAA | — | — | — | — | 200 | — | — | — | — | — | — |
| | | DPAA | — | — | — | — | — | 250 | — | — | — | — | — |
| Citric acid | | | — | — | — | — | — | — | — | — | — | — | — |
| Formula (1) | | | — | — | — | — | — | — | — | — | — | — | — |
| 8-Quinolinol | | | — | — | — | — | — | — | 20 | 24 | 24 | — | — |
| Carboxylic acid compound | | Acetic acid | — | — | — | — | — | — | — | — | — | — | — |
| Paint characteristics | | Total content (% by mass) of alumina particles or silica particles and resin | 14 | 14 | 17 | 14 | 10 | 10 | 12.5 | 12.5 | 14 | 14 | 14 |
| | | Appearance Turbidity | A | A | A | A | A | A | A | A | A | A | A |
| | | Viscosity (mPa · s) at 20° C. | 4000 | 4000 | 1300 | 7000 | 5500 | 6500 | 3000 | 6500 | 4000 | 4700 | 1500 |

| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Heat-resistant resin varnish | | Resin concentration (% by mass) | 18 | 18 | 18 | 18 | 6.5 | 18 | 25 | 18 |
| | Polyamic acid | Solvent | NMP | NMP | NMP | NMP | NMP | NMP | NMP | NMP |
| | | Formula (I) | 100 | 80 | 80 | 80 | 80 | 80 | — | 80 |
| | | Formula (II) | — | — | — | — | — | — | — | — |
| | | U-varnish-A | — | — | — | — | — | — | — | — |
| | Polyamide-imide | | — | — | — | — | — | — | 85 | — |

TABLE 1-continued

| | | | | | | | | | |
|---|---|---|---|---|---|---|---|---|---|
| Alumina particle dispersion | Alumina particle concentration (% by mass) | 0 | 5.2 | — | 7.5 | 3 | 7.5 | 6 | 7.5 |
| | Solvent | — | NMP | — | NMP | NMP | NMP | NMP | THF |
| | Alumina particles/(resin + alumina particles) (% by mass) | 0 | 10 | — | 20 | 20 | 20 | 14 | 20 |
| Silica dispersion | Silica particle concentration (% by mass) | — | — | 15 | — | — | — | — | — |
| | Solvent | — | — | NMP/MeOH | — | — | — | — | — |
| | | — | — | 20 | — | — | — | — | — |
| | Silica particles/(resin + silica particles) (% by mass) | — | — | — | — | — | — | — | — |
| Organophosphorous compound | Ethyl phosphate Content (% by mass) | — | — | — | — | — | — | — | 6 |
| | Phosphoric acid | — | — | — | — | — | — | — | — |
| Sulfonic acid compound | p-Toluenesulfonic anhydride | — | — | — | — | — | — | — | — |
| Amic acid compound | PAA | — | — | — | — | — | — | — | — |
| | DPAA | — | — | — | — | — | — | — | — |
| Citric acid | Citric acid | — | — | — | — | — | — | — | — |
| Formula (1) | 8-Quinolinol | — | — | — | — | — | 10 | — | — |
| Carboxylic acid compound | Acetic acid | — | — | — | — | — | — | — | — |
| Paint characteristics | Total content (% by mass) of alumina particles or silica particles and resin | 18 | 14 | 17 | 14 | 5 | 14 | 17 | 14 |
| | Appearance Turbidity | A | C | A | D | A | C | D | A |
| | Viscosity (mPa · s) at 20° C. | 18000 | 9000 | 4000 | 4000 | <200 | — | — | 3800 |

TABLE 2

| Paint used for partial discharge-resistant insultating coating and coating characteristics | | | Ex. 12 | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|---|---|---|
| | Paint | | Ex. 1 | Ex. 2 | Ex. 3 | Ex. 4 | Ex. 5 | Ex. 6 | Ex. 7 | Ex. 8 | Ex. 9 | Ex. 10 |
| Coating characteristics | Content (% by mass) of alumina particles or silica particles in coating | | 20 | 20 | 14 | 20 | 15 | 15 | 15 | 15 | 20 | 20 |
| | Appearance | Agglomerates | A | A | A | A | A | A | A | A | A | A |
| | | Cissing | A | A | A | A | A | A | A | A | A | A |
| | V-t characteristic 3 kV 10 kHz | Film thickness (μm) | 50 | 50 | 50 | 50 | 47 | 47 | 50 | 50 | 50 | 52 |
| | | Time (h) | 54 | 43 | 7.1 | 20 | 7.3 | 4.5 | 15 | 18 | 48 | 59 |
| | | Evaluation | A | 1 | B | A | B | B | A | A | A | A |

| Paint used for partial discharge-resistan tinsultating coating and coating characteristics | | | Ex. 22 | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|---|---|---|
| | Paint | | Ex. 11 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
| Coating characteristics | Content (% by mass) of alumina particles or silica particles in coating | | 20 | 0 | 10 | 20 | 20 | 20 | 20 | 14 | 20 |
| | Appearance | Agglomerates | A | A | C | A | C | A | — | — | B |
| | | Cissing | A | A | A | A | A | A | — | — | C |
| | V-t characteristic 3 kV 10 kHz | Film thickness (μm) | 50 | 50 | — | 50 | — | — | — | — | — |
| | | Time (h) | 66 | 0.13 | — | 1.0 | — | — | — | — | — |
| | | Evaluation | A | D | — | C | — | — | — | — | — |

(Production of Electric Wires)

Example 23

A partial discharge-resistant paint obtained as in Example 1 was applied to a copper conductor, and baked for about 1 minute while the temperature was continuously increased from an inlet temperature of 350° C. to an outlet temperature of 420° C. This process was repeated to produce an electric wire having a 39-μm-thick partial discharge-resistant insulating coating (alumina particle concentration: 15% by mass) on the surface of the conductor (diameter: about 1 mm).

Comparative Example 17

A polyamic acid varnish obtained as in Production Example 1 was applied to a copper conductor, and baked for about 1 minute while the temperature was continuously increased from an inlet temperature of 350° C. to an outlet temperature of 420° C. This process was repeated to produce an electric wire having a 39-μm-thick insulating layer on the surface of the conductor (diameter: about 1 mm).

(V-t Characteristics of Electric Wires)

The electric wires thus produced were evaluated using the following testing method. Using each electric wire, a twisted pair wire sample was produced in accordance with JIS C3216-5. The twisted pair wire had a tension of 15 N, 9 twists, and a twisted region of about 12 cm. The ends of the twisted pair wire were cut, each end was connected to an electrode, and a voltage was applied. The above-mentioned inverter pulse generator was used as the measuring apparatus. The measurement was performed at a voltage of 2 kV, a frequency of 10 kHz, and a pulse width of 5 μs. Table 3 shows the results. For reference, Table 3 also shows the evaluation results for a commercially available surge-resistant-grade electric wire (trade name: KMKED-20E available from Hitachi Metals, Ltd.).

TABLE 3

| Partial discharge-resistant coating | | | Ex.23 Electric wire formed using paint of Ex. 1 | Comp. Ex.17 Electric wire formed using polyamic acid varnish (Production Example 1) | Reference Commercially available surge-resistant-grade electric wire |
|---|---|---|---|---|---|
| Heat-resistant resin | | Polyimide | 80 | 100 | — |
| | | Polyester-imide | — | — | 80 |
| Inorganic particles | | Alumina particles | 20 | — | — |
| | | Silica particles | — | — | 20 |
| Additive | | Ethyl phosphate | 6 | — | — |
| Electric wire characteristics | Film thickness | Total thickness (μm) | 39 | 39 | 39 |
| | V-t characteristic 2 kV 10 KHz | Time (h) | 816 | 0.48 | 38.6 |

The results shown in Table 3 demonstrate that the electric wire of the example can withstand a high voltage over a much longer period, compared to the electric wires of the comparative example and the reference.

REFERENCE SIGNS LIST

11: Conductor
12: Partial discharge-resistant insulating coating
13: Overcoat layer
21: Electrode
21: Copper tube
22: Metal ball (2 mm in diameter)

23: Aluminum sheet
24: Partial discharge-resistant insulating coating
25: Stainless steel support

The invention claimed is:

1. A partial discharge-resistant paint comprising:
   at least one heat-resistant resin selected from the group consisting of a polyamide resin, a polyimide resin, a polyimide resin precursor, a polyamide-imide resin, a polyetherimide resin, and a polyester-imide resin;
   alumina hydrate particles having an aspect ratio of 2 to 99, and represented by the formula: $Al_2O_3 \cdot nH_2O$, wherein n=1-3;
   at least one selected from the group consisting of an organophosphorus compound and a sulfonic acid compound;
   at least one selected from the group consisting of an amic acid compound, a triazole compound, a compound represented by formula (A) below, a compound represented by formula (B) below, a compound represented by formula (C) below, citric acid, ethylenediaminetetraacetic acid and an ethylenediaminetetraacetic acid derivative; and
   a solvent, wherein
   the solvent comprises 90% by mass or more of a solvent having a boiling point of 100° C. or more at a pressure of 1 atm,
   the alumina particle content is 10 to 30% by mass relative to a total of 100% by mass of the heat-resistant resin and the alumina particles, and
   a total content of the heat-resistant resin and the alumina particles is 10 to 30% by mass:

[Formula 1]

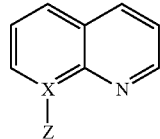

(A)

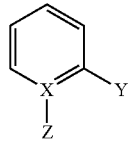

(B)

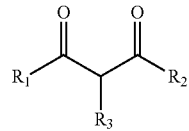

(C)

in each formula, X represents a carbon atom or a nitrogen atom; Z represents OH, SH, a hydrogen atom, or no substituent; Y represents OH, $NH_2$, SH, CHO, COOH, or $COCH_3$; and $R^1$, $R^2$, and $R^3$ each independently represent a $C_{1-2}$ alkyl group.

2. The partial discharge-resistant paint according to claim 1, wherein the partial discharge-resistant paint has a viscosity at 20° C. of 300 to 20000 mPa·s.

3. A partial discharge-resistant insulating coating formed from the partial discharge-resistant paint according to claim 1.

4. An electric wire comprising a conductor and an insulating coating comprising a single layer or a plurality of layers formed on a perimeter of the conductor, wherein at least one layer of the insulating coating is the partial discharge-resistant insulating coating according to claim 3.

5. A rotating electric machine comprising the electric wire according to claim 4.

6. A partial discharge-resistant insulating coating formed from the partial discharge-resistant paint according to claim 2.

7. An electric wire comprising a conductor and an insulating coating comprising a single layer or a plurality of layers formed on a perimeter of the conductor, wherein at least one layer of the insulating coating is the partial discharge-resistant insulating coating according to claim 6.

8. A rotating electric machine comprising the electric wire according to claim 7.

* * * * *